Dec. 30, 1969 A. SZEGVARI 3,486,705

DISPERSING APPARATUS

Filed Jan. 19, 1966 5 Sheets-Sheet 1

INVENTOR.
ANDREW SZEGVARI
BY
ATTORNEY

Dec. 30, 1969    A. SZEGVARI    3,486,705
DISPERSING APPARATUS

Filed Jan. 19, 1966    5 Sheets-Sheet 2

INVENTOR.
ANDREW SZEGVARI
BY
ATTORNEY

Dec. 30, 1969 A. SZEGVARI 3,486,705
DISPERSING APPARATUS
Filed Jan. 19, 1966 5 Sheets-Sheet 3

INVENTOR.
ANDREW SZEGVARI
BY
ATTORNEY

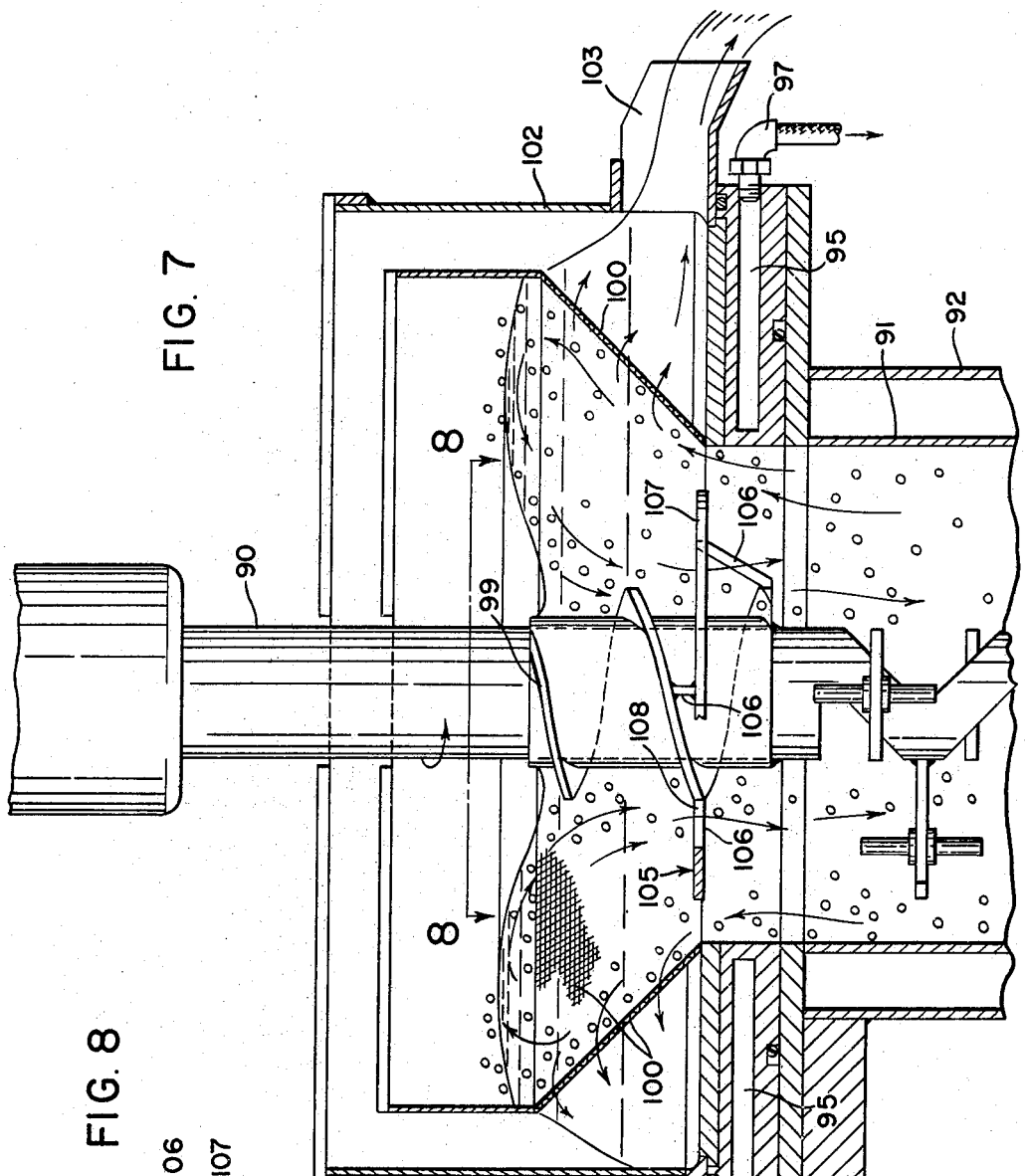
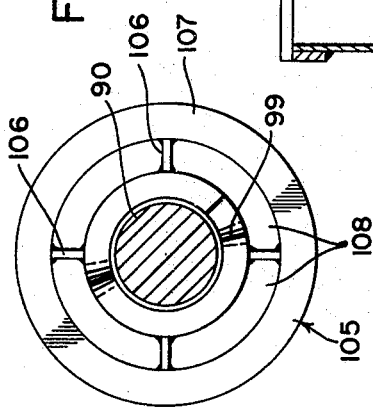

United States Patent Office

3,486,705
Patented Dec. 30, 1969

3,486,705
DISPERSING APPARATUS
Andrew Szegvari, 201 Castle Blvd.,
Akron, Ohio 44313
Continuation-in-part of application Ser. No. 407,716,
Oct. 30, 1964. This application Jan. 19, 1966, Ser.
No. 534,934
Int. Cl. B02c *15/08, 13/00;* B01f *7/20*
U.S. Cl. 241—172                               11 Claims

ABSTRACT OF THE DISCLOSURE

The dispersion of solids or liquids in a liquid by agitation of spherical elements is disclosed. The liquid overflows the top of a cylindrical treating vessel. Two different screen means for separating the spherical elements at the top of the vessel are disclosed, with different means for preventing the accumulation of the spherical elements at the screen surface. In one embodiment, a spinner disc is provided under a horizontal screen which prevents the accumulation of the spherical elements under the screen. In the other embodiment the screen flares outwardly above the top of the treating vessel, and means is provided to move the liquid containing the spherical elements upwardly over the screen and return them to the vessel centrally thereof in order to prevent the accumulation of spherical elements at the screen. An agitator of zigzag contour with arms extending therefrom and activators extending from the arms is described.

---

This application is a continuation-in-part of my application Ser. No. 407,716 filed Oct. 30, 1964, now abandoned.

This invention relates to an improvement in the dispersion of materials in a liquid, by means of balls or the like, kinetically activated by means attached to a vertical shaft, rotated at anywhere from about 250 to 1500 r.p.m., or thereabout. The invention includes an improvement in the apparatus and the method of operating it.

The references herein to the use of spherical elements for agitating, are to be interpreted liberally to include balls and like agitating elements such as generally spherical sand, pebbles, etc., as known in the art. The spherical elements, whether larger or smaller, are all of substantially the same size, although if sand is used the particle size will generally vary somewhat more than if synthetic balls are employed. The use of such spherical elements for grinding or otherwise dispersing a material in a liquid, is well known in the art. See, for example, Szegvari U.S. Patent 2,764,359.

In systems of this general type, there has been no satisfactory provision for separating the balls from the end dispersion. Vertical screens have been utilized which extend upward from the top of the wall of the dispersing chamber, but as the level of the liquid in contact with the screen varies and a portion of the screen which has been wet by the liquid becomes uncovered, a liquid such as a lacquer or the like dries on the screen and tends to close the openings therein. Horizontal screens have been more or less satisfactorily employed when larger balls have been used, but with smaller balls such as sand and synthetic balls 1/16 inch or less in diameter, it has been impossible to keep the balls out of the space which must be left between the inner edge of the separating screen and the agitating shaft. On entering this space, these smaller balls become crushed and tend to jam the agitator shaft and contaminate the end product.

According to this invention, a retaining screen is provided to separate the balls from the end dispersion, whether a dispersion of a ground material or a liquid dispersion, and this screen is submerged in the dispersion at all times. In one embodiment, the screen slopes upwardly away from the central agitating means, near its top. Preferably, a disc projects horizontally from the shaft of the agitating means. The dispersion washes over the screen, carrying the agitator balls with it. The dispersion with entrained suspended matter passes through the screen and the balls are returned downwardly toward the center of the vessel, about the shaft, through the openings in the disc.

In the other embodiment, the retaining screen is substantially horizontal, and below this there is a rotating spinner disc, usually attached to the agitator shaft, which counteracts the migration of the balls toward the underside of the screen. The spinner disc is located so close to the screen that there is a continuously changing velocity gradient field between the disc and the screen, imparted to the liquid by the rotation of the disc. A hydraulic impeller might be used to counteract this migration of the balls.

A generous space is provided between the shaft and the edge of the screen which is equal to at least three times the diameter of one of the balls, and may be substantially more, so that there is no danger of the balls becoming crushed in this space or jamming the agitator shaft. Above this space a housing, usually funnel-shaped, is provided in which a portion of the dispersion is collected as an open head at a height determined by the hydrostatic pressure prevailing there. When the spinner disc is in operation this height is materially reduced.

The diameter of the spinner disc is at least as large as that of the screen. It may be solid or it may be a screen. It is preferably flat although its edge may be cupped downwardly. Although it might seem that this disc, as it rotates, acts by centrifugal force in preventing an accumulation of the balls under the retaining screen, no assured explanation is offered here. Although it is understood how heavy balls such as steel balls 3/16 inch in diameter, for example, would be deflected centrifugally by contact with the surface of such a spinning disc, the fact is that the disc is equally effective with glass or other lightweight balls as small as 1/16 inch in diameter, the density of which is similar to that of the liquid in which they are suspended (which may be a viscous slurry), and they may float therein. The spinner disc is effective when operated as slowly as 250 r.p.m., as well as when operated at 1500 r.p.m. or more. Although designed particularly for use with small balls which measure up to 3/16 inch in diameter, a disc such as here described may be used with larger balls.

The spinner disc is enclosed in an outwardly bulging housing which may be heated or cooled to control the temperature of the end product. Such control is of great value in the treatment of a lacquer, for example, where it is necessary to bring the temperature of the end product below the boiling point of the solvent.

The separator arrangement of this invention which permits the dispersion to flow down through a screen with return of the balls to the vessel, as in the first embodiment, or permits the dispersion to flow upwardly through a screen and thus out of the vessel in which the dispersion is produced, while retaining the balls if the vessel and preventing them from collecting under the screen and clogging it as in the second embodiment, may be used with agitators of different designs. A preferred agitator is shown herein in which there is a single zigzag shaft with agitator blades and activators attached thereto. It has been found that if the blades are attached to a straight vertical shaft there is a tendency for the liquid in contact with the shaft to move with it and to rotate the balls suspended therein around the shaft with little agitation of the balls on which the grinding action depends, whereas by making the shaft zigzag the immediately adjacent liquid and the balls suspended therein are kept constantly in a state of kinetic activation. The blades are preferably at different levels so that the activators are kept out of horizontal alignment and the action of one activator is, insofar as possible, independent of that of all of the other activators.

In what follows, the invention is further described more particularly in connection with the fine grinding of a solid, but the apparatus and process are equally adapted to the production of dispersions. In the drawings:

FIGURE 1A is a view of a portion of this agitator on the line 1A—1A of FIGURE 1;

FIGURE 7 is an elevation of a type of equipment such as described in connection with the first embodiment mentioned above; and FIGURE 8 is a section, on a reduced scale, on the line 8—8 of FIGURE 7.

Figure 1:
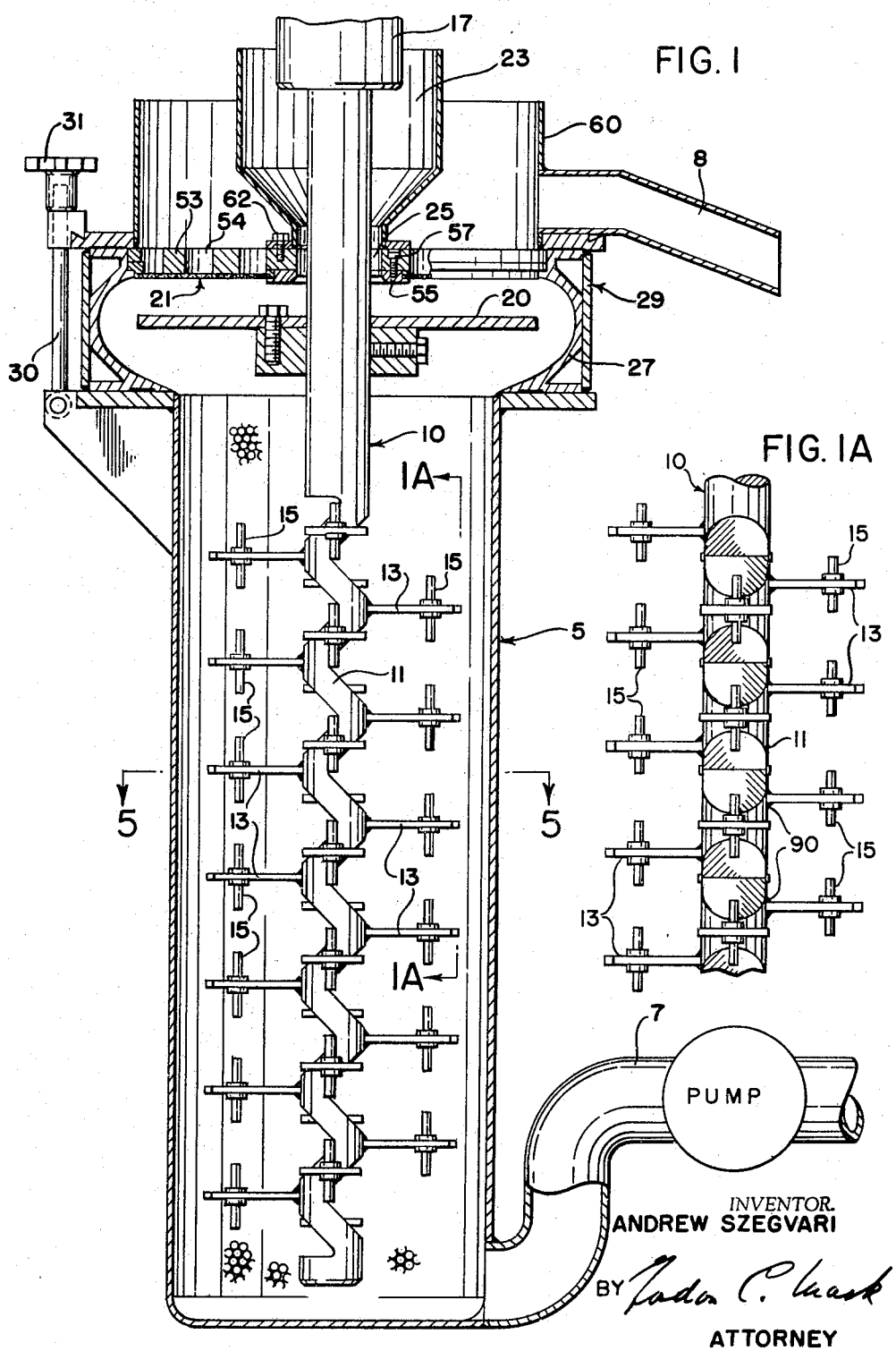
FIGURE 1 is a vertical section through apparatus equipped with the preferred agitator and a type of spinner disc such as described in connection with the second embodiment mentioned above.

Referring to the drawings, the vessel 5 is upright and cylindrical. A dispersion of the liquid and material to be ground is pumped continuously into the vessel through the inlet 7 and the dispersion of the finely ground material overflows away from the vessel through the outlet 8 due solely to the pressure exerted by the pump.

The top of the agitator shaft 10 is cylindrical and the bottom portion 11 which is milled from a cylindrical shaft, is flat with a zigzag contour, as clearly shown in FIGURES 1 and 1A. The agitator blades 13 which are horizontal and provide only minimum agitation of the liquid, are staggered around the shaft and, as shown, each is at a different level from the blade above and below it. A single activator 15 is provided in each blade Activators of different shapes may be used, and in larger vessels they may be spaced different distances from the shaft 10. A preferred agitator is shown. If more than one activator is provided in each blade, these are preferably spaced at different distances from the shaft so that they make different paths. The blades are arranged so that they make different paths. In the arrangement shown, each blade is welded to the shaft at 90 degrees from the blade above and below it. The spacing of the blades around the shaft will depend upon the diameter of the vessel, etc. The agitator is rotated by suitable means, such as a belt about the upper part of the pulley 17. As the agitator is rotated there is relatively uniform agitation of the balls throughout the vessel, with minimum interference with the uniform upward streaming of the dispersion. The vessel is filled with balls which are spaced from one another by the kinetic energy imparted to them by the activators. The circular movement of the liquid dispersion within this vessel is minimized by keeping the frontal projection of the agitating means at a minimum, as by the construction shown, so that the dispersion rises through the vessel without appreciable rotation. A novel and preferred type of agitator is shown.

The means for retaining the balls within the vessel shown in FIGURES 1 to 6, is of the type identified above as the second embodiment. It is applicable to apparatus equipped with different types of agitators, the only limitation being that the liquid dispersion rises in a vessel, and the dispersion is effected by balls which are activated by the rotaton of a vertical shaft.

As the dispersion rises through the vessel it is diverted outwardly about the spinner disc 20 and flows over the disc. Most of the liquid rises through the screen 21 and is discharged. The small balance flows into the funnel-shaped central receptacle 23 and forms a head of liquid in the vessel, of greater or less height, according to the hydrostatic pressure prevailing at the bottom of this head, making it unnecessary to provide a confining top over the vessel. The screen 21 is continuously submerged in the liquid when the apparatus is in operation. The openings through the screen are so small that the balls cannot pass through them.

Between the inner rim of the screen 21 and the shaft 10 is a generous opening 25 which is at least as wide as three times the diameter of one of the balls, and may be larger. In the past, difficulty has been encountered with sand and other small balls such as porcelain, steel, etc. balls $\frac{1}{16}$ inch in diameter and smaller entering the space between the rim of the screen and the shaft and becoming crushed there, jamming the mechanism and contaminating the end product. In apparatus using larger balls this space has been made so small as to prevent the balls from entering it. The space 25 in the apparatus of this invention, is at least three times the diameter of a single agitating ball, and it is immaterial whether the balls rise through this space or not. The wall of the housing 23 is sufficiently higher than the outlet 8 to prevent liquid from overflowing here.

The spinner disc 20 is preferably about the same diameter as the screen 21. It is fastened to the shaft 10 and rotates with it. As the dispersion rises in the vessel it flows over this disc. Without any spinner disc, the agitating balls collect on the undersurface of the screen 21 and eventually clog its openings. The rotation of the spinner counteracts the migration of the balls toward the screen without interfering with the continuous upward flow of the dispersion through the vessel. It is effective with small glass beads in a viscous liquid of a density similar to that of the balls, as well as with small balls much heavier than the liquid in which they are suspended. The physical reason for the action of the spinner is not explained here. The fact is, that by rotating this disc at the speed of the agitator which is ordinarily between about 250 and 1500 revolutions per minute, the balls do not accumulate under the retaining screen but remain relatively uniformly distributed throughout the entire space within the vessel in spite of the continuous flow of the dispersion up through the vessel and out through the screen. In order to accomplish this the spinner disc must be so near the screen that when the disc is rotating there is a continuously changing velocity gradient field between the disc and the screen, the velocity being greatest at the disc.

The spinner disc is substantially the same diameter as the area defined by the cylindrical wall 5 of the mill, although it may be more or less. Thus the wall bulges out at 27 above the top of the wall 5 to a diameter somewhat larger than that of the screen 21. It may be provided with means for heating or cooling the liquid passing through it. This top portion is enclosed in a box-like structure 29 which is clamped in place on different sides of the mill by pivoted screws 30 and nuts 31.

Figure 2:
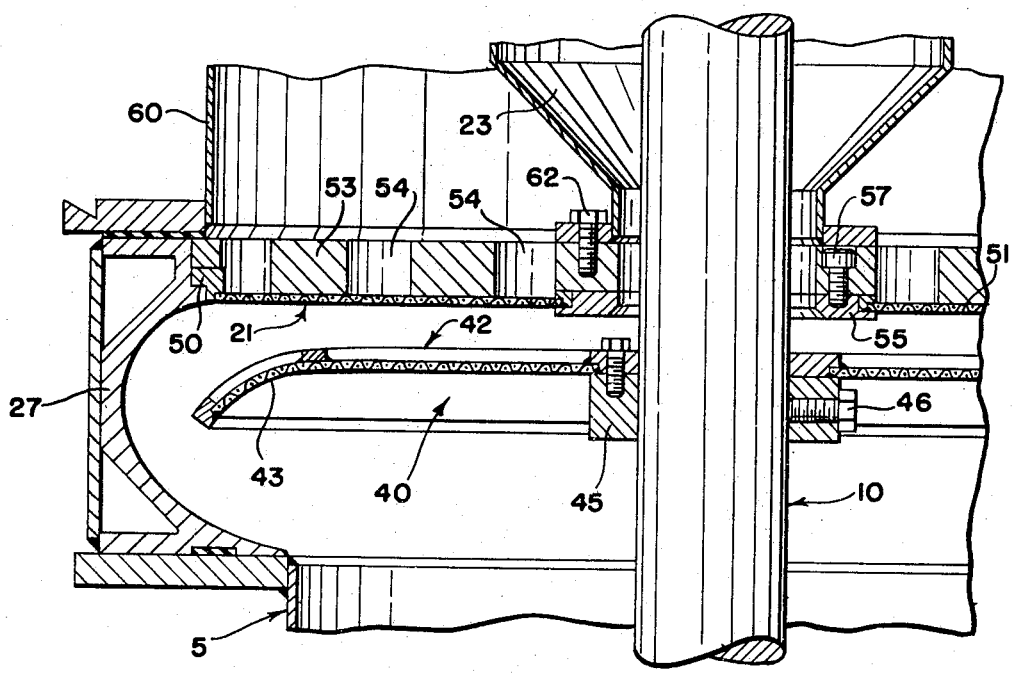
FIGURE 2 is a section through a part of the top of apparatus equipped with a different type of spinner disc.

Instead of using a solid spinner disc 20, the disc is equally effective if it is made of a screen 40 as shown in FIGURE 2. The construction of this screen is shown in the exploded view in FIGURE 3, which also includes an exploded view of the screen 21. The spinner disc, as shown here, comprises the ribbed ring 42 to the bottom of which the screen 43 is fastened. The mesh of this screen is so small that the balls do not pass through it. The ring 42 is bolted to the ring 45 which, in turn, is bolted to the shaft by the setscrew 46.

Figure 3:
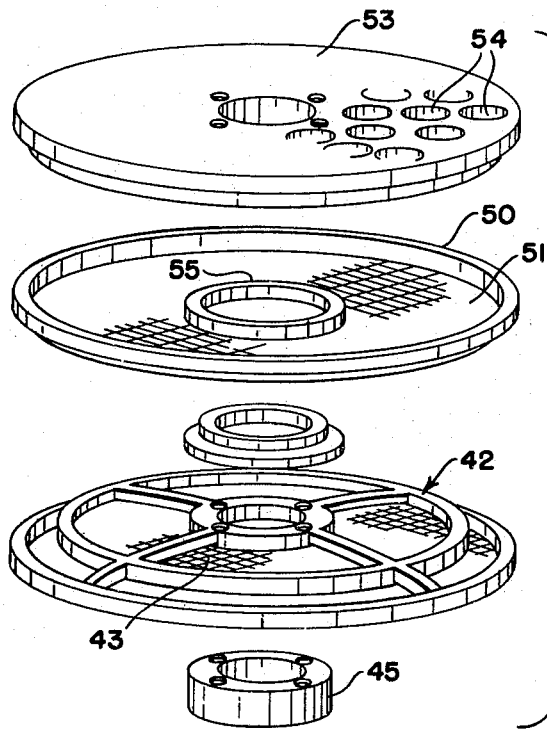
FIGURE 3 is an exploded view of parts of the equipment shown in FIGURE 2.

The parts of the screen 21 are clearly shown in FIGURE 3. This screen includes the ring 50 to the bottom of which the screen 51 is attached. Its mesh is so small that the balls cannot pass through it. Over this is the back-up plate 53 with large openings 54 in it. This back-up member 53 is bolted to the inner ring 55 by bolts 57 (FIGURE 2). The ring 50 is supported by the bulged wall 27. The container 60 which collects the dispersion which has passed through the screen 21 and delivers it to the overflow 8, is constructed as an integral part of the removable upper portion of the apparatus.

The funnel-shaped central receptacle 23 in which the head of the dispersion builds up is bolted to the back-up plate 53 by bolts 62. When the disc is rotated, there is an outwardly increasing speed gradient field in the space between the screen and the spinner disc, due to the action of the disc. This reduces the hydrostatic head of the liquid within the receptacle 23, so that this receptacle need not be very high.

Figure 4:
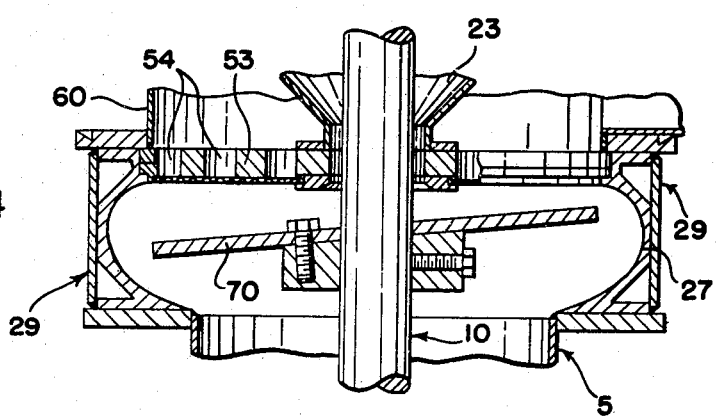
FIGURE 4 is a view similar to the view shown in FIGURE 2 but with the spinner disc tilted.
Figure 5:
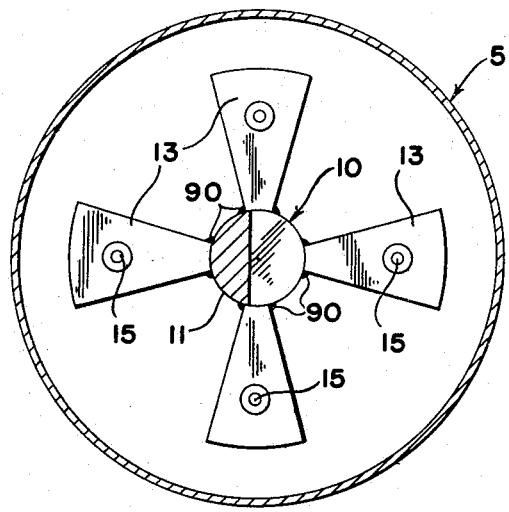
FIGURE 5 is a horizontal section on the line 5—5 of FIGURE 1.

It has been found that the spinner disc works somewhat better if it is not fastened horizontally to the shaft but is tilted somewhat, and in FIGURE 4 the disc 70 is shown at an angle.

Figure 6:
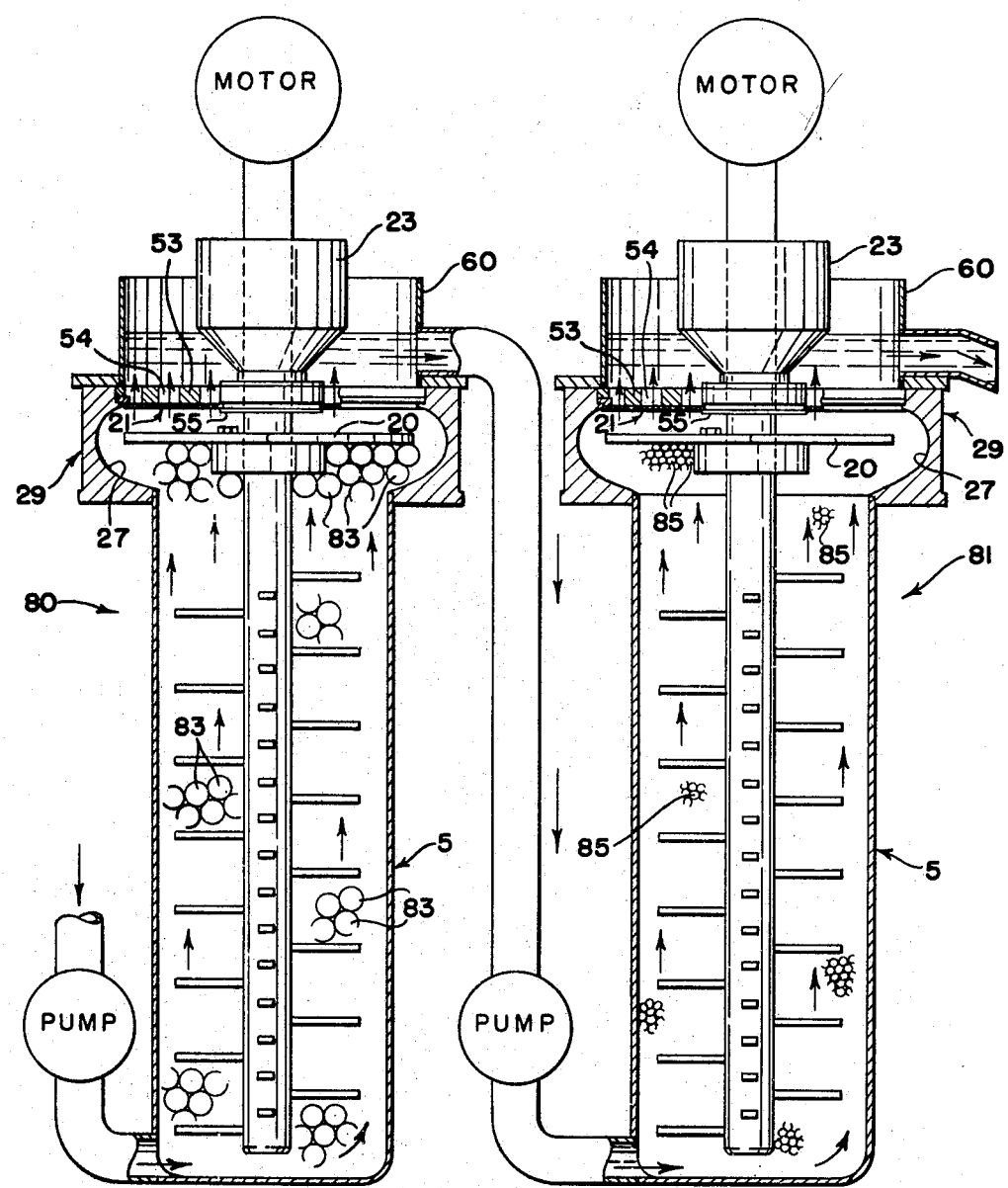
FIGURE 6 is a vertical section of two agitator means in series.

Two or more dispersion units may be run in series, as indicated in FIGURE 6 where two units 80 and 81 are shown. The agitator shafts are straight and although no activators are shown on the agitator blades, it is presumed that suitable activators will be provided. Such equipment does not grind or otherwise disperse as efficiently as the equipment shown which is equipped with a zigzag agitator shaft. A spinner disc 20 of the type illustrated in FIGURE 1 is shown. The agitating balls 83 in the unit 80 are larger than the balls 85 in the unit 81. The larger balls 83 are designed for coarser grinding; and the smaller balls 85 in the unit 81 grind the dispersion of the material received from the unit 80 to a finer mesh. Such a series of units may be similarly used for producing liquid dispersions.

The means for retaining the balls within the vessel shown in FIGURES 7 and 8 is the type identified, above, as the first embodiment. It is applicable to apparatus equipped with different types of agitators, the only limitation being that the liquid dispersion rises in a vessel and the dispersion is effected by balls which are activated by the rotation of a vertical shaft. In both embodiments of the retaining means the retaining screen is at all times immersed in the dispersion, even though the volume of the dispersion contained within the equipment varies. If the variance in the volume of the liquid should expose some of the screen, the liquid would tend to dry on the screen with danger of clogging it.

The embodiment shown in FIGURES 7 and 8 is designed to increase the volume of throughput through the column. Spherical elements such as glass and zirconium oxide, and even sand measuring as small as $1/32$ inch in diameter and as large as several inches can be used satisfactorily in this equipment.

The agitating means on the shaft 90 is of the type illustrated in prior figures, although it is to be understood that different types of agitating means may be employed. The chamber 91 is jacketed at 92 for regulation of the temperature within the chamber. Although heating means may be circulated through this jacket, usually a cooling liquid will be employed. The jacket may be connected with the cooling chamber 95 although it may be entirely separate therefrom. Liquid is introduced into the chamber 95 through the inlet 96 and removed through the outlet 97. The spiral 99 attached to the shaft 90 above the agitator is wound helically in the opposite direction from the helical spiral of the agitator and tends to return the agitator balls to the chamber. It causes the liquid adjacent the shaft to flow down into the top of the chamber 91 and liquid rises from the chamber 91 adjacent the chamber wall. It flows up through the screen 100 and here the balls are separated from the liquid dispersion. The dispersion is collected in the outer chamber 102 and drains through the outlet 103. The agitating balls circle over the screen, back toward the agitator, and are thus returned to the chamber. The disc 105 is fastened to the shaft 90 at about the level of the bottom of the screen 100. The bars 106 support the imperforate peripheral portion 107 and provide openings 108 through which the balls return to the chamber.

As the shaft is rotated the agitator activates the balls and these grind the solid or liquid suspension and produce a fine dispersion which flows up through the chamber 91. As it reaches the top of the chamber the upward flow is against the wall of the chamber and over the screen 100. The fine dispersion passes through the screen to the outlet 103 and the balls are returned to the chamber adjacent the shaft, through the openings 108.

The invention is covered in the claims which follow.

What I claim is:

1. Apparatus for the dispersion of solids or liquids in a liquid, which includes a chamber with agitating means therein which comprises a vertical shaft located substantially centrally within the chamber, which shaft projects from the top of the chamber, means for introducing a liquid and material to be dispersed into the chamber adjacent its bottom, substantially spherical elements within the chamber with means connected with said shaft for agitating them and thus suspending them in the liquid within the chamber, a retaining screen adjacent the top of the chamber and liquid-retaining means above the screen whereby the screen is submerged in liquid at all times, conduit means for removing from the chamber liquid which has passed through the screen and adjacent the screen is means to counteract the tendency of said spherical elements to collect at the screen.

2. The apparatus of claim 1 in which the retaining screen is over the top of the chamber to retain the spherical elements within the chamber, with a space equal to at least three times the diameter of one such element between the inner edge of the screen and the shaft and means surrounding said space and extending upwardly from it to retain a head of the liquid contents of the chamber.

3. The apparatus of claim 2 in which said means to counteract the tendency of the spherical elements to collect at the screen is located under the screen and reduces the hydrostatic head of the liquid retained in said means which surrounds said space and extends upwardly from it.

4. The apparatus of claim 3 in which the means for counteracting the tendency of the spherical elements to collect under the screen is a spinner disc and there is provided means for spinning the same about the shaft, said disc being about the size of the screen and impervious to the passage of the balls therethrough.

5. The apparatus of claim 4 in which the spinner disc is solid.

6. The apparatus of claim 4 in which the spinner disc is attached to the shaft and is at such a short distance below the screen that when the shaft is rotated at operating speed there is a continuously changing velocity gradient field between the two.

7. The apparatus of claim 4 in which the chamber is cylindrical except for a housing which bulges outwardly about the spinner disc, and said spinner disc is attached to the shaft; and said disc and the screen are of greater diameter than the cylindrical portion of the wall of the chamber.

8. The apparatus of claim 1 in which the screen is slanted upwardly away from the shaft at the top of the chamber, there is liquid-retaining means rising from the top of the screen, and the means to counteract the tendency of the spherical elements to collect at the screen includes means around the shaft at substantially the bottom of the screen which separates liquid adjacent the wall of the chamber from liquid adjacent the shaft.

9. The apparatus of claim 8 in which said means which separates the liquid is a substantially horizontal disc attached to the shaft which is solid adjacent its periphery and provided with openings adjacent the shaft.

10. The apparatus of claim 8 in which an enclosure with a liquid drain therefrom surrounds the screen and is in liquid-tight contact with the wall of the chamber below the screen.

11. The apparatus of claim 1 in which (1) the agitating means includes means extending radially from the shaft for agitation of the liquid and (2) the means to counteract the tendency of spherical elements to collect at the screen is affixed to said shaft and is located between the top of said radially extending means and the screen.

References Cited

UNITED STATES PATENTS

| 1,792,059 | 2/1931 | Altwegg | 259—7 |
| 1,993,446 | 3/1935 | Huff. | |
| 3,298,618 | 1/1967 | Talpey | 241—46.17 |
| 2,431,478 | 11/1947 | Hill | 259—8 X |
| 3,134,549 | 5/1964 | Quackenbush | 241—74 |
| 3,332,628 | 7/1967 | Wadham | 241—74 |
| 3,135,474 | 6/1964 | Schold | 241—79 |

FOREIGN PATENTS 1,343,058  11/1963  France.

ROBERT C. RIORDON, Primary Examiner

JAMES F. McKEOWN, Assistant Examiner

U.S. Cl. X.R.

259—8